G. LANE.
WATER LEVEL REGULATOR AND INDICATOR.
APPLICATION FILED FEB. 15, 1909.
976,741.
Patented Nov. 22, 1910.
2 SHEETS—SHEET 1.
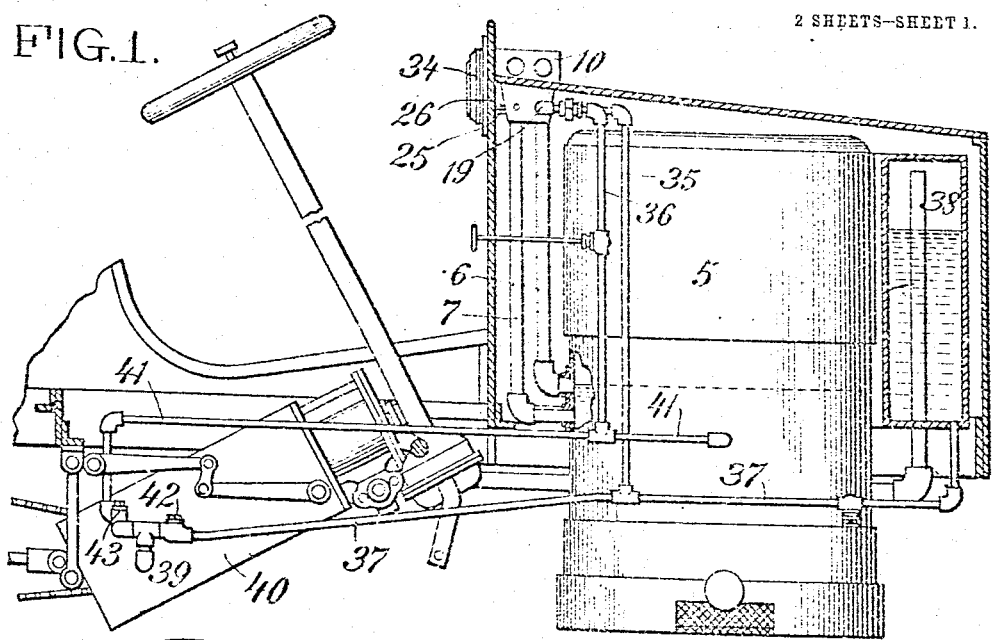
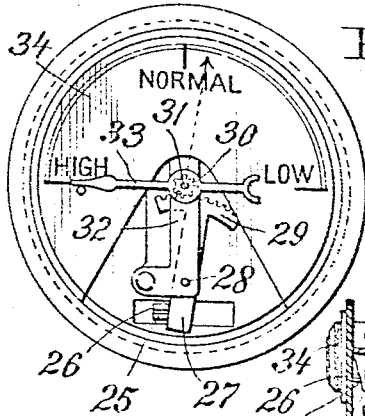
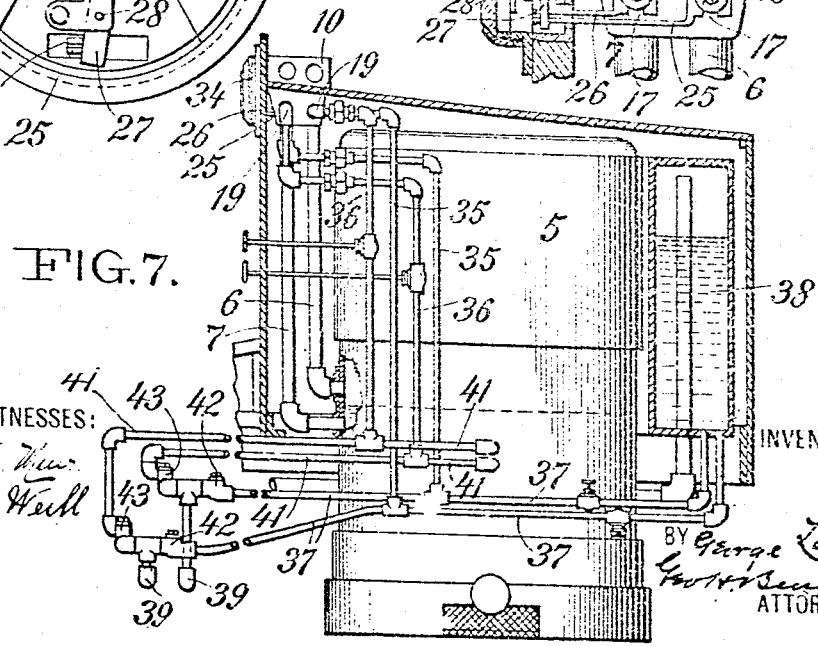
WITNESSES:
INVENTOR
George Lane.
BY
ATTORNEY

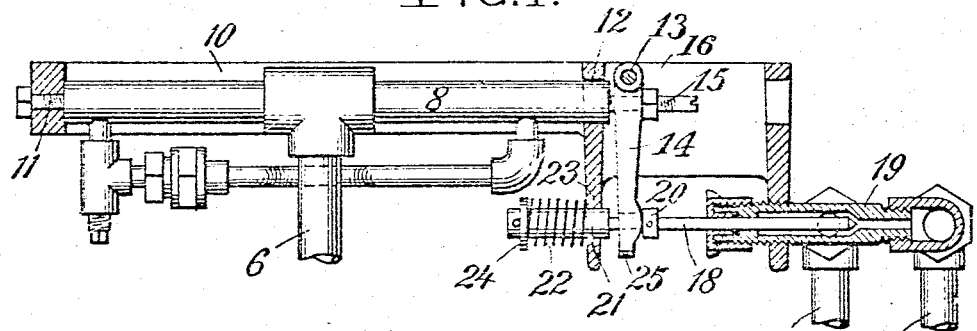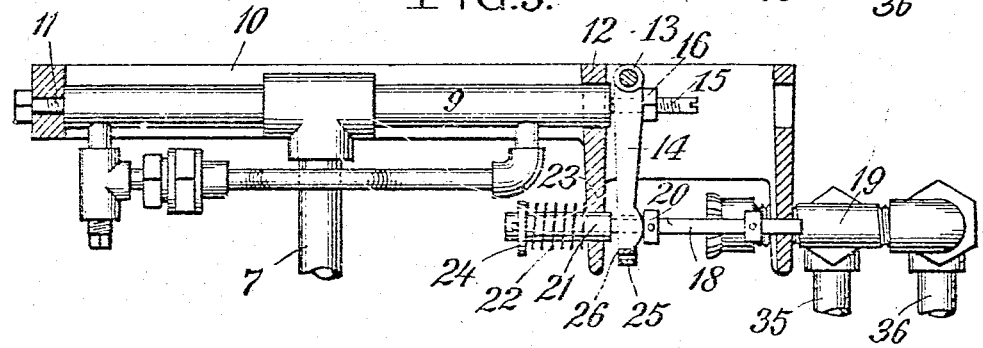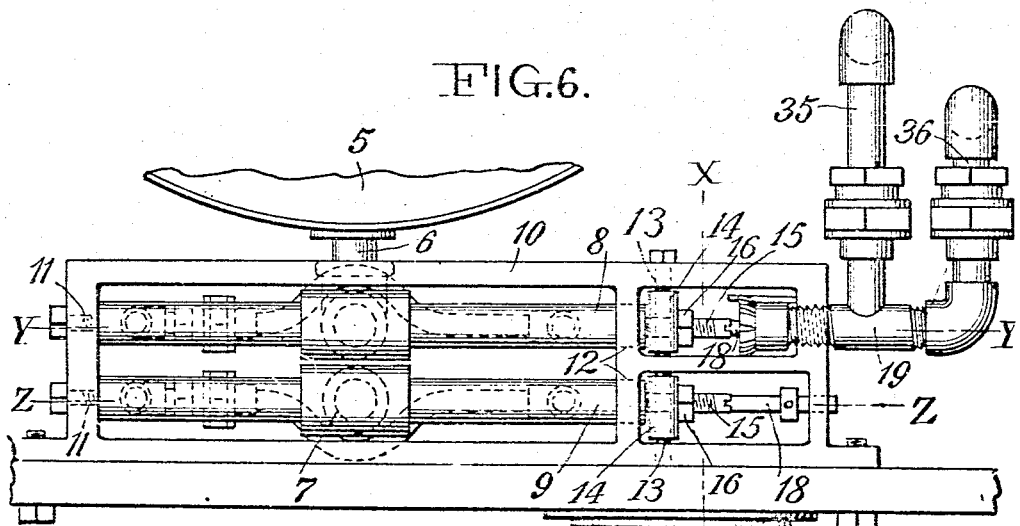

UNITED STATES PATENT OFFICE.

GEORGE LANE, OF POUGHKEEPSIE, NEW YORK, ASSIGNOR TO LANE MOTOR VEHICLE COMPANY, A CORPORATION OF NEW YORK.

WATER-LEVEL REGULATOR AND INDICATOR.

976,741.

Specification of Letters Patent. Patented Nov. 22, 1910.

Application filed February 15, 1902. Serial No. 477,897.

*To all whom it may concern:*

Be it known that I, GEORGE LANE, a citizen of the United States, residing at Poughkeepsie, in the county of Dutchess, State of New York, have invented certain new and useful Improvements in Water-Level Regulators and Indicators, of which the following is a specification.

This invention consists of a device adapted to be used in connection with a steam boiler and which has for its purpose to automatically regulate and indicate the level of the water in the boiler.

By reason of my improved device I am able to do away with the usual glass water gage which is liable to be destroyed from a blow without or from sudden access of pressure from within, and is further objectionable as the glass is often dissolved by the high temperature, or rendered opaque by deposits within the glass. Further, considerable difficulty is experienced in maintaining the packings connecting such tube to the boiler.

In my improved construction the use of the glass gage is entirely done away with and the indication of the water level made visible by the movement of a pointer over a dial.

The accompanying drawings will serve to illustrate my invention.

Figure 1 is a side elevation and a partial vertical section taken through a motor vehicle showing the position of the regulator and indicator relative to the boiler and water circulation. Fig. 2 is a front view of the indicating dial. Fig. 3 is a transverse section taken approximately on the line X—X of Fig. 6. Fig. 4 is a longitudinal section taken on the line Y—Y of Fig. 6. Fig. 5 is a longitudinal section taken on the line Z—Z of Fig. 6. Fig. 6 is a plan view. Fig. 7 shows a modification of my invention.

Referring to the drawings: 5 indicates a steam boiler. At different levels and above the position usually occupied by the fusible plug of said boiler are the pipes 6, 7. These pipes are carried upward and connected to horizontally disposed pipes, 8, 9. The pipes 8, 9 are mounted in a frame 10 and secured in any suitable manner to the left-hand end of said frame as by screws 11. The right-hand of these pipes project through openings 12 in the frame. Pivoted in the frame 10, at 13, are levers 14, and located in a threaded opening in the upper part of these levers is screw 15, provided with a nut 16. The lower end of the levers 14 are forked at 17, and embrace the rods 18, either or both of which may form valves for the by-pass valves 19. By adjusting the screw 15 and nut 16, the position of the levers 14, relative to the pipes 8—9, can be regulated.

Upon the rods 18 are adjustable stops 20, and surrounding the rods 18 at their rear, which are enlarged as shown at 21, are springs 22 which bear at one end upon depending portions 23 of the frame 10 and at the other end upon the caps 24 on the end of the rods 18.

Projecting laterally from the levers 14 are arms 25, 26 which bear upon the lower end of a rack lever 27, pivoted at 28. The upper end of the lever 27 forms the rack sector 29 and the teeth thereof mesh with the pinion 30 mounted on a shaft 31 carried in frame 32, which is the same frame in which the rack lever 27 is mounted. Mounted also on shaft 31 is a pointer 33 adapted to sweep over dial 34, having the notation "High," "Normal," "Low" disposed 90° apart. Connected to the by-pass valve 19 are two pipes 35, 36. The pipe 35 is connected to a pipe 37 which pipe is connected to the bottom of the water tank 38 and also to the inlet orifice of a pump, indicated at 39, within the casing of the engine 40. The pipe 36 is connected at one end to the outlet orifice of the pump 39 through pipe 41, and to the interior of the boiler. Suitable check valves 42, 43 are between the pipes 37, 41 and pump 39. In the drawings (Figs. 1 to 6 inclusive) but one by-pass valve 19 is employed and but one water circulation.

In the modification shown in Fig. 7 two pumps with by-pass valve connections and two water circulations are employed, the parts being duplicated as will be seen from the drawings without further description.

The operation of my device will be readily understood.

Assuming the water in the boiler to be as shown in Fig. 1, the stem of the by-pass valve 19 will be withdrawn as shown in Fig. 4, thereby permitting the water drawn from the water tank by pipe 37 to be delivered through pipes 41, 36 to the by-pass valve 19 and by pipes 35, 37 back to the pump 39, or, in other words, a short circuit of the water circulation results when the by-pass valve 19 is open. Should now the water in the boiler drop below the level of that shown, steam will enter the pipe 6. The heating of this pipe communicated to the pipe 8 will cause such pipe to expand, thereby pressing forward lever 14 to close the by-pass valve 19, in which case the water will be drawn from the tank 38 through pipe 37 and through pipe 41, delivered to the boiler until the normal water level is reëstablished. As soon as movement takes place in the pipe 8, the arm 25 acts upon the rack lever 27, thereby shifting the rack lever and causing the needle to move over the dial until "Normal" is passed and the position taken as indicated by the dotted arrow between "Normal" and "Low." Should the water continue to drop in the boiler until the orifice of the pipe 7 is open, the same action will take place in pipe 9 and through the lever 26 acting upon the sector the needle will carry to the point marked "Low" on the dial.

In the construction shown in Fig. 7, the action is the same; if for any reason the water level continues to recede below the pipe 6, when it uncovers the pipe 7, the second by-pass valve 19 under control of pipe 9 is also closed.

It will be understood that the action of the by-pass valves is successive when opening or closing.

I wish it understood that the water circulation disclosed is only illustrative of the action of my improved regulator and such circulation may be modified in many particulars without in any wise departing from the intent of my invention.

Having thus disclosed my invention, I claim:

1. In a combined water level indicator and regulator, an indicating mechanism, a plurality of temperature devices operating upon said indicating mechanism successively to indicate the water level, and means coöperating with one of said devices for regulating the water level.

2. A water level indicator for boilers, comprising an indicating mechanism movable in the same direction to indicate successive water levels, a plurality of temperature devices responsive to different levels in the boiler, said temperature devices successively acting on the indicating mechanism to indicate successive levels of the water in the boiler.

3. In a combined water level indicator and regulator, an indicator, a water feed, a device variable in length to actuate the indicator and operate the water feed at a certain level, an auxiliary temperature device in association therewith and acting upon said indicator when the water is at a lower level.

4. In a water level indicator for steam boilers, a single visual indicating means, a plurality of expansion tubes coöperating therewith, adapted to expand in similar direction, said tubes being successively responsive to varying conditions within the boiler.

5. In a combined water level indicator and regulator, indicating mechanism, a main temperature device controlling simultaneously the water feed and operating said indicating mechanism, and an auxiliary temperature device coöperating with said first named device to extend the range of said indicating mechanism.

6. A combined water level indicator and regulator, comprising an indicating mechanism, a by-pass valve, a water feeding means, a device variable in length for variations in temperature adapted to control said water feeding means through said by-pass valve, a second or auxiliary temperature device independent of said first named temperature device, but coöperative successively therewith to actuate said indicating mechanism, both of said temperature devices being connected to said indicating mechanism.

7. In a combined water level indicator and regulator for steam boilers, a plurality of expansion tubes, independent steam conducting means connected at different levels to the boiler and to said expansion tubes, indicating mechanism, a by-pass valve in the water circulation system, means connected with one of said expansion tubes for closing said valve and actuating said mechanism to indicate the water level within the boiler, and means connected with the other of said tubes for further actuating said mechanism to indicate a different water level.

8. A combined water level indicator and regulator for steam boilers, comprising an indicator, a device variable in length and expansible in one direction for variation in temperature, said device being located above the maximum level of the water in the boiler, means connecting said device and said indicator, means for connecting said device with the interior of a boiler, an auxiliary temperature device in proximity to said first named temperature device and expansible in a like direction, and means coöperating with one of said temperature devices for regulating the water feed.

9. In combination with a steam boiler, a pair of pipes communicating with the interior of said boiler at different levels, an indicator scale and a plurality of expansion devices introduced between said indicator scale and said pipes to indicate upon said dial successive variation in the water level.

10. A water level indicator comprising a plurality of expansion tubes, an indicator scale and means for indicating the expansion of each tube progressively on the same scale.

In testimony whereof, I affix my signature, in the presence of two witnesses.

GEORGE LANE.

Witnesses:
J. M. JANES,
WILLIAM COUCH.